Dec. 8, 1964    H. MARTIN ETAL    3,160,771
SEMICONDUCTOR RECTIFIER DEVICE FOR ELECTRIC MACHINES
Filed May 8, 1963                    4 Sheets-Sheet 1

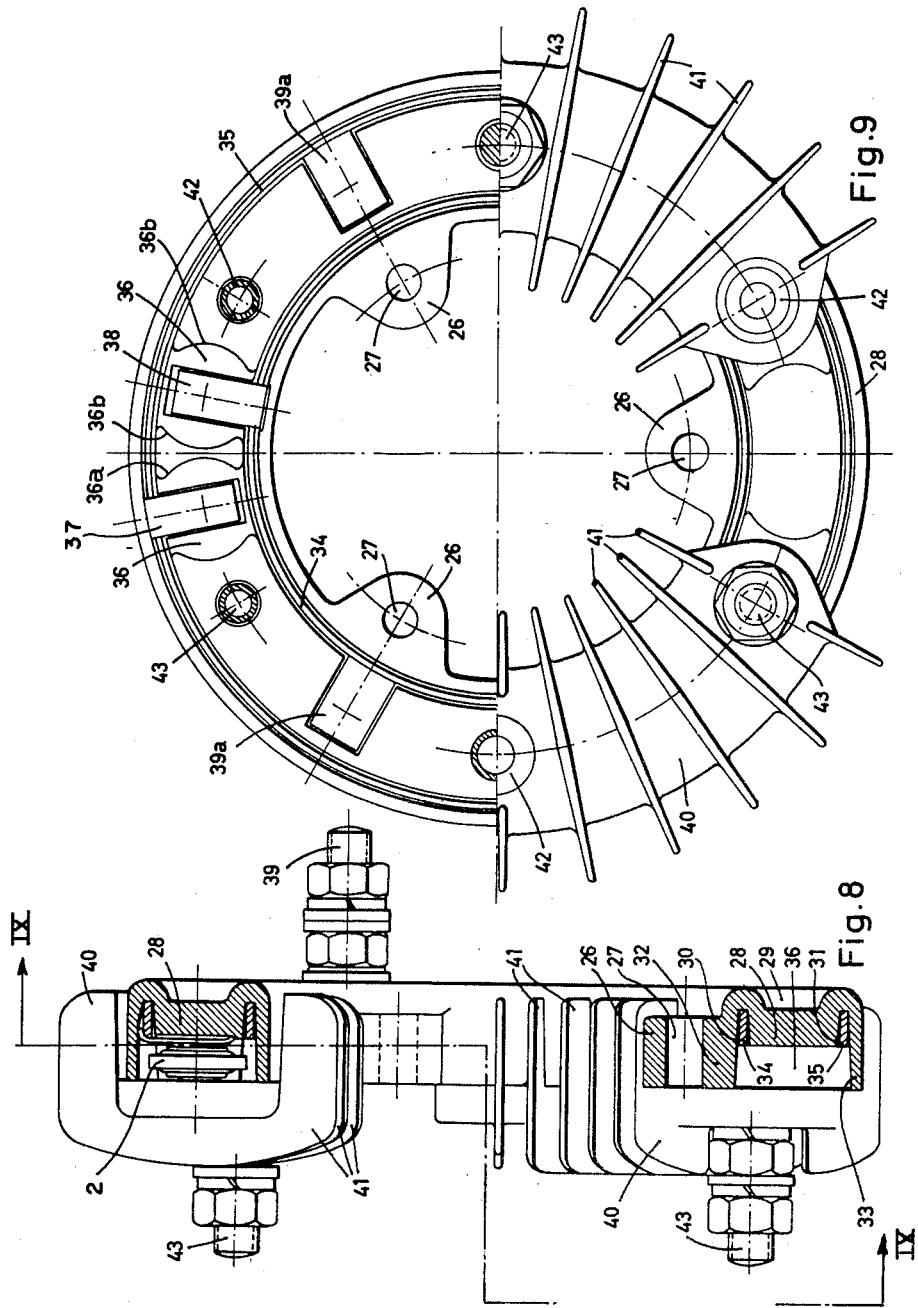

United States Patent Office 3,160,771
Patented Dec. 8, 1964

3,160,771
SEMICONDUCTOR RECTIFIER DEVICE FOR ELECTRIC MACHINES
Heinz Martin and Herbert Vogt, Munich, Germany, assignors to Siemens-Schuckertwerke Aktiengesellschaft, Berlin, Germany, a corporation of Germany
Filed May 8, 1963, Ser. No. 278,908
Claims priority, application Germany, May 22, 1962, S 79,550
17 Claims. (Cl. 310—68)

Our invention relates to rectifier attachment devices for electrical machines and more particularly to semiconductor rectifier assemblies for use on electric machines, such as an alternating-current generator for providing rectified output voltage.

It is an object of our invention to provide a sturdy and efficient rectifier assembly unit that can be readily secured mechanically to an electrical machine, for example an alternating-current generator, and electrically connected to the machine windings for rectifying the alternating current produced thereby, without the necessity of substantially modifying the structure of the machine and of requiring dismantling the machine when inspection of the rectifier unit is necessary.

It is also an object of the invention to provide a rectifier assembly unit for attachment to and use with a conventional dynamoelectric machine without requiring substantial modification of the electrical machine in order to accommodate the rectifier unit in the limited space available within the housing of the electrical machine.

Another object of the invention is to provide an assembly of semiconductor diodes or semiconductor controlled rectifiers that is readily accessible for inspection or replacement of individual semiconductor components while mechanically attached to and electrically connected with an electrical machine without necessitating the dismantling of the electrical machine.

A further object of the invention is to provide a rectifier attachment unit of such construction as to promote the dissipitation of heat generated during its operation.

Still another object of our invention is to devise a rectifier attachment unit attachable to an electrical machine in such a manner that the housing of the electrical machine also forms a protective housing for the rectifier attachment unit.

With the above and related objects in view, the invention includes the provision of a rectifier assembly unit that can be attached either to the outside or inside of the end bearing plate or bearing shield of an electrical machine housing. The rectifier attachment unit comprises an insulating body formed as a suitably recessed ring or coaxial abutting pair of rings within which a plurality of semiconductor components are mounted. Also mounted in recesses of the insulating body are a pair of concentrically arranged electrical conductors or bus bars; and the ring-shaped assembly is adapted and equipped for coaxial attachment to the bearing shield or housing so as to extend concentrically around the rotor axis of the machine, and for electric connection of the component rectifiers to the stator windings of the machine.

According to further features of the invention, when a pair of insulating rings is provided, one of the rings has apertures through which one of the electrodes of each of the respective semiconductor components protrudes. In mounting this embodiment on the bearing plate or other part of an alternator housing, for example, the protruding electrode of each semiconductor component engages a counter contact on the bearing plate or housing. The other electrodes of the semiconductor componens are electrically connected, preferably by spring contacts, with respective bus conductors located in the second insulating ring from which the rectified current can be drawn. The bus bars are preferably shaped as circular arcs or rings, and they may be provided with cooling fins to dissipate heat generated in and about the semiconductor components.

According to other features of our invention, the device comprises a single insulating ring for accommodating both the semiconductor components and the bus conductors in recesses or apertures of the ring. The apertures in which the semiconductor components are received are closed by a plurality of electrically conductive ring segments formed with cooling fins to dissipate heat. One of the electrodes of each of the semiconductor components is in electrical engagement with one of the conductive ring segments while the other electrode of each semiconductor component connects electrically with one of the buses through a spring contact. Alternating current is delivered from the generator to terminals on the conductive ring segments, and direct current can be drawn from terminals carried by the insulating ring and electrically connected to the circular bus conductors.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 8 is a side elevational view partly in section of another embodiment of the present invention;

FIG. 9 is a rear elevational view thereof partly in section along the line IX—IX of FIG. 8 and also omitting all of the upper ring segment 40;

Figure 3:
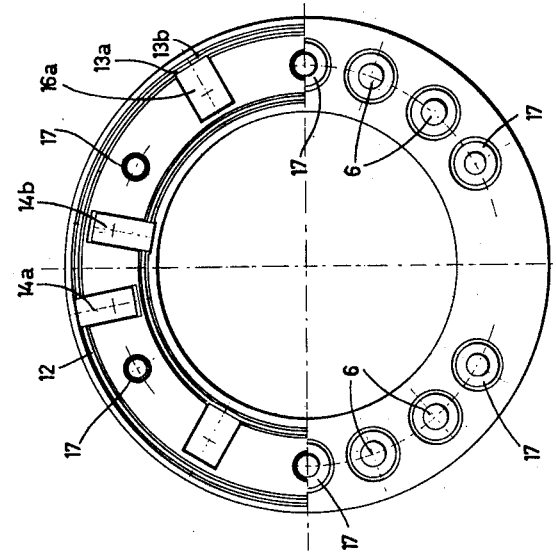
FIG. 3 is a rear elevational view thereof partly in section along the line III—III in FIG. 1.
Figure 1:
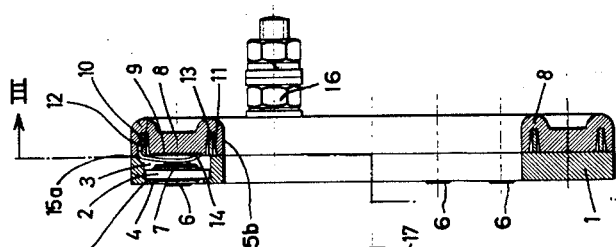
FIG. 1 is a side elevational view partly in section of an embodiment of the present invention.
Figure 2:
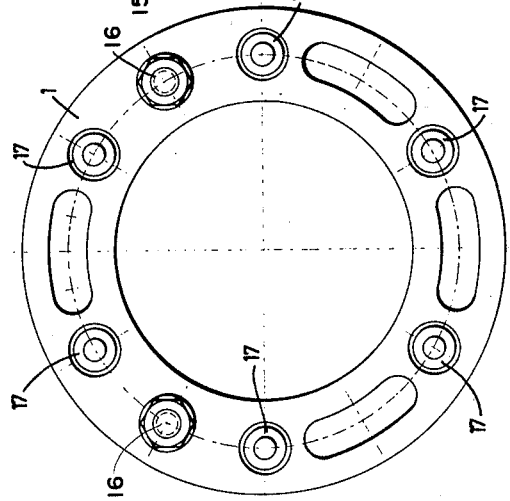
FIG. 2 is a front elevational view of the embodiment shown in FIG. 1.

In the embodiment of the invention illustrated in FIGS. 1 to 3, the rectifier attachment unit includes an annular member or ring 1 of insulating material. The ring 1 serves as a carrier of six circular disc-shaped rectifier elements, such as silicon power diodes, which are in rectifying connection with the machine windings. The ring 1 has respective recesses 3 for accommodating the rectifier elements. In the direction toward the left of the ring (FIG. 1), each recess 2 has an annular shoulder 5 which defines an aperture 4 of reduced cross section so that a marginal zone of the semiconductor element 2 abuts against and is seated on the shoulder 5, and one of the electrodes 6, 7 of the rectifier element 2 protrudes from the aperture 4.

A second annular member or ring 8 of insulating material, coaxial with and secured as a unitary body to the first-mentioned ring 1 by hollow rivets 17, is formed with a pair of concentric annular recesses 10, 11 extending in the axial direction of the rings 1, 8 and radially spaced from each other. Circular bus bars 12, 13 are received edgewise in the concentric recesses 11, 10 respectively, as shown in FIGS. 1 and 3. A shallow recess 9 also extends radially from one of the concentric recesses 10, 11 toward but terminating in a shoulder just short of the other of the conecentric recesses. As shown in FIG. 1, an arcuate leaf spring 14 bears at one end in the shallow recess 9 against the terminating shoulder thereof that lies between the concentric recesses 10, 11, is gripped at the other end in the recess 10 between the bus bar 12 and the marginal portion 15a of the ring 8, and presses with the curved center portion thereof against the electrode 7 of the semiconductor element 2. As can be seen, the leaf springs 14 or 14a, 14b according to FIG. 3 serve not only to connect the semiconductor elements 2 with the respective bus bars 13 and 12, but also bias the semiconductor element 2 into the seat formed by the shoulder 5 in recess 3 of the ring 1.

Three pairs of semiconductor elements 2 are shown in FIGS. 1 and 3 as being spaced substantially 120° apart in the ring assembly 1, 8. This arrangement is adapted for full-wave rectification of three-phase alternating current in that the cathode 6 of one of each pair of semiconductor elements 2 is electrically connected by the leaf spring 14a to one bus bar 13 while the anode 7 of the other of each pair of elements 2 is electrically connected by the leaf spring 14b to the other bus bar 12. The binding posts 16, shown in FIGS. 1 and 2, are electrically connected with the bus bars 12, 13 respectively, in the insulating ring assembly 1, 8 and serve as the direct current terminals. As illustrated in the upper part of FIG. 3, the rectangular head 16a at the opposite end of the threaded shank of one binding post 16 has a side face that is welded or soldered to the ends 13a, 13b of the bus bar 13, which ends are separated by a small slit. In the same manner, the other binding post 16 has a head that is welded to the slightly spaced ends of the bus bar 12 as shown on the upper left side of FIG. 3. Of course, the bus bars 12, 13 may be formed as endless rings in which case the binding posts 16 may be welded or soldered at any suitable position along their length.

Figure 4:
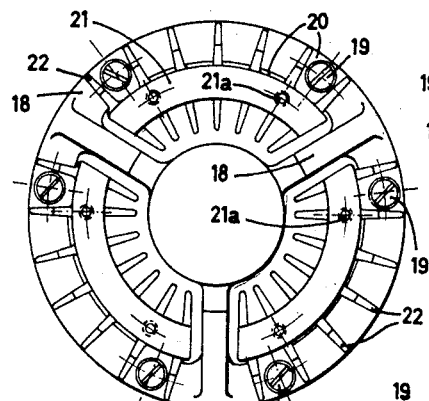
FIG. 4 is a front elevational view of an electrical machine bearing plate to which the ring segments 21 in accordance with the present invention have been attached.

An end bearing plate 18 which forms part of the housing of an alternating current generator or alternator is shown in FIG. 4. A cooling body member 20, electrically insulated from the end bearing plate 18 by layers of suitable insulating material (not shown) is secured to the bearing plate 18 by the screws 19 which are also insulated from the bearing plate 18 by insulating washers (not shown). The cooling body member 20 is formed with cooling fins 22 such as are well known in the art for radiating heat to ambient air, and is also formed with a plurality of contact ring segments 21 equal in number to the number of phases of alternating current generated by the alternator. The contact ring segments 21 are provided with threaded or tapped bores 21a in which screws 19a that are received in the passages 17a through the hollow rivets 17 are threaded so as to secure the insulating rings to the cooling body member 20 which, in turn, is secured by the screws 19 to the end bearing plate 18 of the electrical machine housing. Each of the ring segments 21 is electrically connected by an alternating current terminal of the alternator to one of its armature coils, respectively, which are not illustrated as they are considered to be well known in the art. The three ring segments 21 shown in FIG. 4 are therefore obviously insulated from one another and from the end bearing plate 18.

While in the embodiment described above, those electrodes (6 in FIG. 1) of the semiconductor elements that are to engage a countercontact on the machine housing protrude out of the radial end plane of the insulating ring accommodating the elements, these electrodes may also be flush with the ring plane or stay in the recess behind that plane, the countercontacts in each case having the complementary shape required for the contact engagement.

Regardless of any such variations, the provision of a plural-part insulating ring stucture, such as in the embodiment of FIGS. 1 to 4, affords the further advantage of a greatly simplified assembling and mounting method. It is only necessary to place the individual semiconductor elements more or less loosely into the respective cup-shaped recesses of one ring component, the direct-current bus bars into the other ring component, and then place the two insulating parts together. The contact springs then automatically prepare the electric interconnection of the rectifier elements to such an extent that it remains only necessary to fasten the ring assembly to the bearing shield or other housing portion of the electric machine in the interior or on the outer side thereof.

Figure 5:
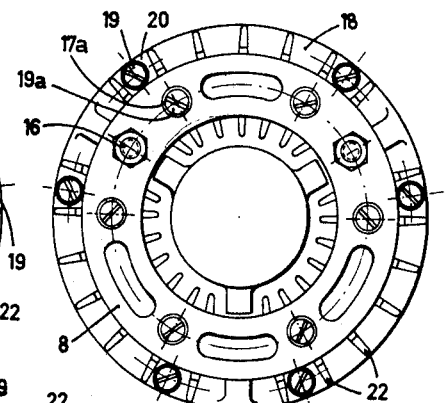
FIG. 5 is a the same view of the embodiment as shown in FIG. 2 reduced in size and shown mounted on the structure illustrated in FIG. 4.
Figure 6:
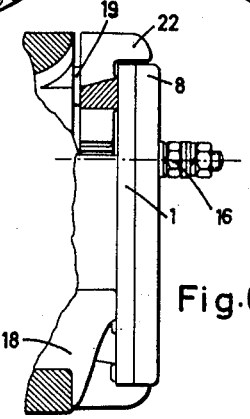
FIG. 6 is a side elevational view partly in section of the structure shown in FIG. 5.

When the insulating ring assembly 1, 8 shown in FIGS. 5 and 6, is secured to the end bearing plate 18 by the screws 19a, the electrodes 6, 7 of the pairs of rectifier elements 2, respectively, engage the corresponding ring segments 21. Accordingly, each pair of rectifier elements 2 is connected in series across their cathode 6 and anode 7, respectively, with the corresponding alternating current phase terminal of the alternator and between both of the direct current terminals 16.

Heat arising in the rectifier elements 2 is radiated by the cooling body member 20 to the surrounding air. The cooling action is increased particularly by the fan action of the alternator rotor and may be even further increased by playing a cool air stream on the cooling fins 20 through the alternator.

A second embodiment of the invention in which only one insulating ring is employed is illustrated in FIGS. 7 to 10.

Figure 7:
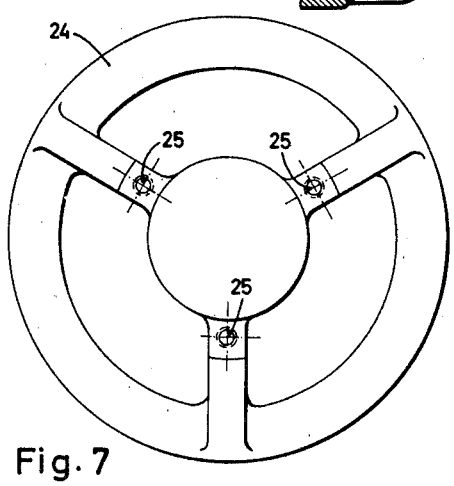
FIG. 7 is a front elevational view of the bearing plate of a conventional electric machine.

In FIG. 7 there is shown an end bearing plate 24 of a housing such as is to be found generally in a conventional electrical machine. At the locations 25, the end bearing plate 24 is provided with threaded or tapped bores for a purpose to be described more fully hereinafter.

In FIGS. 8 and 9 the insulating ring 28, similar to the ring 8 of the embodiment shown in FIG. 1 is formed with concentric recesses 30, 31 respectively, adjacent the marginal portions 32, 33. Direct current bus bars 34, 35 are received edgewise in the concentric recesses 30, 31 respectively. In the upper part of FIG. 8, a semiconductor rectifier element 2 is shown received in its corresponding recess 36, and as can be seen in the upper part of FIG. 9, the recess 36 is defined by the arcuate portions 36a, 36b of the insulating ring 28. The upper part of FIG. 9 is similar to that of FIG. 3 in that the semiconductor rectifier elements 2 are omitted from the upper part of this figure and in that there are provided arcuate leaf springs 37, 38 to connect the rectifier elements 2 with the corresponding bus bars 35, 34 respectively. The rectangular head 39a at the end of each direct-current binding post 39, shown similarly in FIG. 3, is welded or soldered to the slightly spaced ends of the bus bars 34, 35 respectively. The other rectifier element pairs in the embodiment of FIGS. 7 to 10 are similar to the first embodiment hereinabove described, are installed in a corresponding manner with corresponding polarity to achieve full-wave rectification, and are secured to the respective direct current bus bars by corresponding leaf springs.

After the semiconductor rectifier elements 2 are seated in the recesses 36, the recesses 36 are closed by cooling body members 40 formed as ring segments and provided with cooling fins 41. The cooling body members 40 and the insulating ring 28 are secured to each other by the hollow rivets 42 and the screws 43 and, at the same time, provide contact pressure between the electrodes of the respective semiconductor rectifier element 2 and its corresponding electric contact surface with the cooling bodies 40. Each of the cooling bodies 40 serves as an alternating current contact segment or bus bar for one of the three phase windings of the alternator to which it is connected by the respective alternating current phase terminal 43.

The insulating ring 28 to which the cooling body segments 40 are secured is formed with inwardly radially projecting eyes 26, 27 so that the rectifier assembly unit of this invention may be suitably attached by screws (not shown) passing through the eye holes 27 and threaded into the tapped bores 25 of the end bearing plate 24 of the alternator shown in FIG. 7.

Figure 10:
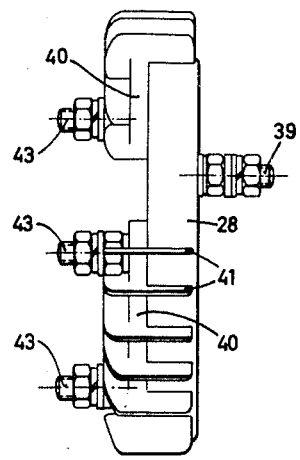
FIG. 10 is a slightly modified side elevational view reduced in size of the embodiment shown in FIG. 8.
Figure 11:
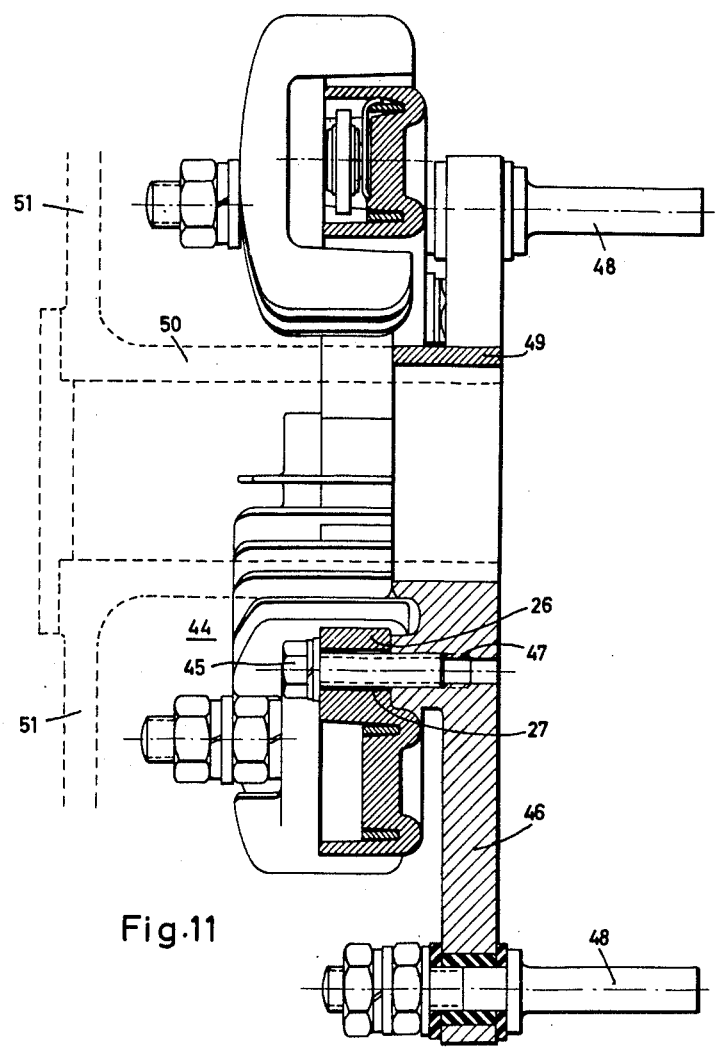
FIG. 11 is a side elevational view partly in section and partly diagrammatic of still another embodiment of the present invention shown mounted on an electrical machine bearing plate.

A further embodiment of the invention is illustrated in FIG. 11 in which a rectifier assembly unit such as is shown in FIGS. 9 and 10 or one like that shown in FIGS. 1 to 6 is carried on a holder within the housing of the electrical machine which, in accordance with the known art of carriers or star holders for electric brushes, is turnably and fixably arranged on the bearing support of the bearing end plate. In FIG. 11 there is shown a rectifier assembly unit 44 such as is illustrated in FIG. 10. The screws 45 passing through the holes or channels 27 in the eyes 26 are threaded in the tapped bores 47 of the brush star holder 46 to secure the rectifying unit 44 to the brush star holder. The brush carrier pins 48 for the brushes of the electrical machine are carried by the brush star holder 46 and are electrically insulated therefrom by bushings and washers of insulating material in accordance with the known art.

The hub portion 49 of the brush star holder 46 is mounted on a portion of the bearing support 50 of the bearing end plate which lies within the machine, the arms of the bearing end plate extending to the peripheral rim of the bearing end plate being designated in FIG. 11 by the reference numeral 51.

If the pins 48 are terminals of the winding of the electrical machine, i.e. if the machine carries the alternating current winding on its rotor, or is an outside pole machine, the pins 48 can be connected by appropriate electrical conductors to the terminals 43. In inner pole machines the pins 48 can also be carriers of direct current brushes which lie within the excitation zone of the machines.

While the invention has been illustrated and described as embodied in a rectifier assembly unit adapted to be attached to the housing of an electrical machine, it is not intended to be limited to the details shown, since various modifications and structural changes may be made without departing in any way from the spirit of the present invention.

To those skilled in the art it will be obvious from the foregoing that the invention can be readily adapted for various applications and can be given embodiments other than particularly illustrated and described herein, without departing from the essential characteristics of the generic or specific aspects of our invention and within the scope, meaning and range of equivalents of the following claims.

We claim:

1. A rectifier device for use with an electric machine having a stator housing and stator windings therein, comprising ring-shaped insulating structure, fastening means engaging said structure for coaxially securing it to said housing, a plurality of semiconductor rectifier elements mounted and peripherally distributed in said insulating ring structure, each of said elements having at least two electrodes, bus conductor means disposed in said ring structure and in electric connection with one electrode of said respective elements, said other electrodes being connectable to said stator windings.

2. A rectifier device for use with an electric machine having a protective housing, comprising in combination, a pair of coaxially aligned annular members of insulating material having a plurality of recesses; means for securing said annular members to the machine housing; a plurality of semiconductor components in the recesses of one of said annular members, each of said semiconductor components having at least a pair of electrodes of which one is adapted to be electrically connected to the machine; and a plurality of bus conductors in said recesses of said other annular members and electrically connected to the other electrode of each semiconductor component.

3. A rectifier assembly unit for use with an electric machine having a protective housing, comprising in combination, body means including a ring member of insulating material having a plurality of recesses, and a plurality of electrically conductive ring segments secured to said insulating ring member and covering said recesses; means for securing said body means to the machine housing; a plurality of semiconductor components received in a first group of said plurality of recesses, each of said semiconductor components having at least a pair of electrodes of which one is in engagement with one of said electrically conductive ring segments, said electrically conductive ring segments being adapted to be electrically connected to the machine; and a plurality of bus conductors received in a second group of said plurality of recesses and electrically connected to the other electrode of each semiconductor component.

4. A rectifier assembly unit for use with an electric machine having a protective housing, comprising in combination, a pair of coaxially aligned annular members of insulating material having a plurality of recesses, one of said annular members having additionally a plurality of apertures forming respective coaxial extensions of said recesses in said one annular member; means for securing said annular members to the machine housing; a plurality of semiconductor components in the respective recesses of said one annular member, each of said semiconductor components having at least a pair of electrodes of which one protrudes through one of said apertures to the outside of said annular member for electrical connection to the machine; and bus conductors received in the recesses of said other annular member and electrically connected to the other electrodes of said semiconductor components.

5. A rectifier assembly unit for use with an electric machine having a protective housing, comprising in combination, body means including a ring member of insulating material having a plurality of recesses, and a plurality of electrically conductive ring segments secured to said insulating ring member and covering said recesses; means for securing said body means to the machine housing; a plurality of semiconductor components received in a first group of said plurality of recesses, each of said semiconductor components having at least a pair of electrodes of which one is in engagement with one of said electrically conductive ring segments, said electrically conductive ring segments being adapted to be electrically connected to the machine; a plurality of bus conductors in a second group of said plurality of recesses; spring contact means electrically interconnecting the other electrode of each semiconductor component with one of said bus conductors, and external terminal means electrically connected with said bus conductors and adapted to be connected to a load.

6. A rectifier assembly unit for use with an electric machine having a protective housing, comprising in combination, a pair of coaxially aligned annular members of insulating material having a plurality of recesses, one of said annular members having additionally a plurality of apertures forming respective coaxial extensions of said recesses in said one annular member; means for securing said annular members to the machine housing; a plurality of semiconductor components in the respective recesses of said one annular member, each of said semiconductor components having at least a pair of electrodes of which one protrudes through one of said apertures to the outside of said annular member for electrical connection to the machine; a plurality of bus conductors in the recesses of said other annular member; and spring contact means electrically interconnecting the other electrode of each semiconductor component with one of said bus conductors, and external terminal means electrically connected with said bus conductors for connection to a load.

7. A rectifier assembly unit for use with an electric machine having a protective housing, comprising in combination, body means including a ring member of insulating material having a plurality of recesses, and a plurality of electrically conductive ring segments secured to said insulating ring member and covering said recesses; means for securing said body means to the machine housing; a plurality of semiconductor components received in a first group of said plurality of recesses, each of said semiconductor components having at least a pair of electrodes of which one is in engagement with one of said electrically conductive ring segments, said electrically conductive ring segments being adapted to be electrically connected to the machine; a plurality of bus conductors in a second group of said plurality of recesses; spring contact means electrically interconnecting the other electrode of each semiconductor component with one of said bus conductors, and simultaneously biasing said semiconductor component in a direction to maintain the engagement of said one electrode thereof with the respective electrically conductive ring segment.

8. A rectifier assembly unit for use with an electric machine having a protective housing, comprising in combination, a pair of coaxially aligned annular members of insulating material having a plurality of recesses, one of said annular members having additionally a plurality of apertures forming respective coaxial extensions of said recesses in said one annular member; means for securing said annular members to the machine housing; a plurality of semiconductor components in the respective recesses of said one annular member, each of said semiconductor components having at least a pair of electrodes of which one protrudes through one of said apertures to the outside of said annular member for electrical connection to the machine; a plurality of bus conductors in the recesses of said other annular member; and spring contact means electrically interconnecting the other electrodes of each semiconductor component with one of said bus conductors, and simultaneously biasing said semiconductor component in a direction to maintain said one electrode thereof protruding through the respective aperture.

9. A rectifier assembly unit for use with an electric alternator having a protective housing including a bearing plate, comprising in combiation, electrically conductive ring segments carried by the bearing plate and insulated therefrom, said ring segments being adapted to be electrically connected to the alternator; a pair of coaxially aligned annular members of insulating material having a plurality of recesses, one of said annular members being additionally formed with a plurality of apertures each associated with one of the recesses in said one annular member; means for securing said annular members to the bearing plate so that said apertures are in registry with said electrically conductive ring segments; a plurality of semicondutcor components in the recesses of said one annular member, each of said semiconductor components having at least a pair of electrodes of which one protrudes from the aperture associated with the corresponding electrically conductive ring segment; and a plurality of bus conductors in the recesses of said other annular member and electrically connected to the other electrode of each semiconductor component.

10. A rectifier assembly unit for use with an electric alternator having a protective housing including a bearing plate, comprising in combination, electrically conductive ring segments carried by the bearing plate and insulated therefrom, said ring segments being adapted to be electrically connected to the alternator; a pair of coaxially aligned annular members of insulating material having a plurality of recesses, one of said annular members being additionally formed with a plurailty of apertures each associated with one of the recesses in said one annular member; means for securing said annular members to the bearing plate so that said apertures are in registry with said electrically conductive ring segments; a plurality of semiconductor components in the recess of said one annular member, each of said semiconductor components having at least a pair of electrodes of which one protrudes from the aperture associated with the corresponding electrically conductive ring segment; a plurality of bus conductors in the recesses of said other annular member; and spring contact means electrically interconnecting the other electrode of said semiconductor component with one of said bus conductors and simultaneously biasing said semiconductor component in a direction to maintain said one electrode in engagement with the corresponding electrically conductive ring segment.

11. A rectifier assembly unit for use with an electric machine having a protective housing, comprising in combination, body means including a ring member of insulating material having a plurality of recesses, and a plurality of electrically conductive ring segments secured to said insulating ring member and covering said recesses; means for securing said body means to the machine housing; a plurality of semiconductor components received in a first group of said plurality of recesses, each of said semiconductor components having at least a pair of electrodes of which one is in engagement with one of said electrically conductive ring segments, said electrically conductive ring segments being adapted to be electrically connected to the machine; and a plurality of bus conductors received in a second group of said plurality of recesses and electrically connected to the other electrode of each semiconductor component; said conductive ring segments secured to said ring member having cooling fins for dissipating heat generated in said semiconductor components.

12. A rectifier assembly unit for use with an electric machine having a protective housing including a bearing plate, comprising in combination, electrically conductive ring segments carried by the bearing plate and insulated therefrom, said ring segments being adapted to be electrically connected to the machine; a pair of coaxially aligned annular members of insulating material having a plurality of recesses, one of said annular members being additionally formed with a plurality of apertures each associated with one of the recesses in said one annular member; means for securing said annular members to the bearing plate so that said apertures are in registry with said electrically conductive ring segments; a plurality of semiconductor components in the recesses of said one annular member, each of said semiconductor components having at least a pair of electrodes of which one protrudes from the aperture associated with the corresponding electrically ring segments; and a plurality of bus conductors in the recesses of said other annular members and electrically connected to the other electrode of each semiconductor component; said conductive ring segments secured to said ring member having cooling fins for dissipating heat generated in said semiconductor components.

13. A rectifier assembly unit for use with an electric machine having a protective housing including a bearing plate, comprising in combination, carrier means mounted on said bearing plate within the housing of the machine; annular structure at least partly formed of insulating material; means for securing said structure to said carrier means in coaxial relation to the bearing plate; a plurality of semiconductor components disposed and peripherally distributed in said annular structure, each of said semiconductor components having at least a pair of electrodes one of which is adapted to be electrically connected to the machine; and bus conductors carried by said annular structure and electrically connected to the other electrode of each semiconductor component.

14. In a rectifier assembly unit according to claim 13, said carrier means for said annular structure being simultaneously a contact-brush carrier of the machine.

15. With an electric rotary machine having a stator housing defining a machine axis and having stator-winding terminals, the combination of a rectifier device comprising ring-shaped insulating structure, fastening means engaging said structure and securing it to said housing in coaxial relation thereto, a plurality of semiconductor rectifier elements mounted and peripherally distributed in said insulating ring structure, each of said elements having at least two electrodes, bus conductor means disposed in said ring structure and in electric connection with one electrode of said respective elements, and means electrically connecting said other electrodes to said stator-winding terminals.

16. With an electric rotary machine having a stator housing with a bearing plate defining a rotation axis and having stator-winding terminals on said housing, the combination of a rectifier device comprising ring-shaped insulating structure firmly secured to said housing adjacent to said bearing plate in coaxial relation to said axis, a plurality of semiconductor rectifier elements mounted and peripherally distributed in said insulating ring structure, each of said elements having at least two electrodes, bus conductor means disposed in said ring structure and in electric connection with one electrode of said respective elements, said other electrodes being in electrical connection with said winding terminals.

17. With an electric rotary machine having a stator housing with a bearing plate defining a rotation axis and having stator-winding terminals on said housing, the combination of a rectifier device comprising ring-shaped insulating structure coaxially disposed within said housing, carrier means securing said structure to said bearing plate, a plurality of semiconductor rectifier elements mounted and peripherally distributed in said insulating ring structure, each of said elements having at least two electrodes, bus conductor means disposed in said ring structure and in electric connection with one electrode of said respective elements, said other electrodes being in electrical connection with said winding terminals.

References Cited in the file of this patent
UNITED STATES PATENTS

| | | |
|---|---|---|
| 2,934,662 | Robinson | Apr. 26, 1960 |
| 3,001,121 | Kerr | Sept. 19, 1961 |
| 3,041,484 | Freer et al. | June 26, 1962 |
| 3,078,409 | Bertsche et al. | Feb. 19, 1963 |